(12) United States Patent
Warner

(10) Patent No.: US 12,049,363 B2
(45) Date of Patent: Jul. 30, 2024

(54) CONVEYOR BELT RIP DETECTION METHOD AND SYSTEM

(71) Applicant: BARGE'S BELTING SOLUTION PTY LTD, Wellard (AU)

(72) Inventor: Graham Trevor Warner, Wellard (AU)

(73) Assignee: BARGE'S BELTING SOLUTION PTY LTD, Western Australia (AU)

( * ) Notice: Subject to any disclaimer, the term of this patent is extended or adjusted under 35 U.S.C. 154(b) by 0 days.

(21) Appl. No.: 17/802,868

(22) PCT Filed: Feb. 23, 2021

(86) PCT No.: PCT/AU2021/050154
§ 371 (c)(1),
(2) Date: Aug. 26, 2022

(87) PCT Pub. No.: WO2021/168505
PCT Pub. Date: Sep. 2, 2021

(65) Prior Publication Data
US 2023/0091198 A1    Mar. 23, 2023

(30) Foreign Application Priority Data
Feb. 28, 2020    (AU) .............................. 2020900588

(51) Int. Cl.
*B65G 43/02*    (2006.01)
*B65G 15/08*    (2006.01)
(52) U.S. Cl.
CPC ............. *B65G 43/02* (2013.01); *B65G 15/08* (2013.01); *B65G 2203/0275* (2013.01); *B65G 2203/044* (2013.01)

(58) Field of Classification Search
CPC .. B65G 43/02; B65G 15/08; B65G 2203/044; B65G 2203/0275
USPC ...................................................... 198/810.02
See application file for complete search history.

(56) References Cited

U.S. PATENT DOCUMENTS

| | | | | |
|---|---|---|---|---|
| 6,032,787 A | * | 3/2000 | Kellis ..................... | B65G 43/02 198/810.02 |
| 8,127,918 B2 | * | 3/2012 | Warner ................... | B65G 43/02 198/840 |
| 8,285,494 B2 | * | 10/2012 | Vozner ................. | G01B 11/043 198/810.04 |

(Continued)

FOREIGN PATENT DOCUMENTS

| | | |
|---|---|---|
| AU | 2009206205 | 8/2011 |
| CN | 101708792 | 5/2010 |

(Continued)

OTHER PUBLICATIONS

International Search Report and Written Opinion for International (PCT) Patent Application No. PCT/AU2021/050154, dated Apr. 7, 2021, 10 pages.

(Continued)

*Primary Examiner* — James R Bidwell
(74) *Attorney, Agent, or Firm* — Sheridan Ross P.C.

(57) ABSTRACT

A system for detecting a rip in a conveyor belt carrying a material, the system including: a sensor arrangement configured to provide a light curtain under at least a portion the conveyor belt to detect material passing through the rip thereby detecting the rip. A related method is also disclosed.

19 Claims, 6 Drawing Sheets

(56) References Cited

U.S. PATENT DOCUMENTS 11,401,113 B2 * 8/2022 Polak .................. G06T 7/11

FOREIGN PATENT DOCUMENTS

| | | | | |
|---|---|---|---|---|
| CN | 102745478 | | 10/2012 | |
| CN | 104495294 | | 4/2015 | |
| CN | 207030292 | | 2/2018 | |
| CN | 112896990 A | * | 6/2021 | ............ B65G 43/08 |
| DE | 2746882 | | 4/1979 | |

OTHER PUBLICATIONS

International Preliminary Report on Patentability for International (PCT) Patent Application No. PCT/AU2021/050154, dated Jan. 20, 2022, 14 pages.

* cited by examiner

CONVEYOR BELT RIP DETECTION METHOD AND SYSTEM

CROSS-REFERENCE TO RELATED APPLICATIONS

This application is a national stage application under 35 U.S.C. 371 and claims the benefit of PCT Application No. PCT/AU2021/050154 having an international filing date of 23 Feb. 2021, which designated the United States, which PCT application claims the benefit of Australian provisional patent application no. 2020900588 filed on 28 Feb. 2020, the contents of each of which are incorporated by reference in their entireties.

TECHNICAL FIELD

The invention relates to a method and a system for detecting a rip or tear in a conveyor belt.

BACKGROUND

Rips or tears, sometimes referred to as "irregularities", may occur in conveyor belts which may cause loss of material or lead to failure of the belt. One such means to detect such irregularities is described in AU 2009206205 B2 "Method and apparatus for monitoring a conveyor belt".

Such a method and apparatus may include use of a detection system configured to detect transverse displacement of edges of the conveyor belt as the conveyor belt travels past the detection system, and determine, using the transverse displacements of the edges of the conveyor belt and one or more operating rules, if an operating irregularity of the conveyor belt has occurred.

The transverse displacement is achieved using rollers which are arranged to apply a transverse stretching load to the belt and thus if there are any irregularities, such as rips or tears, the edges of the belt may undergo a transverse displacement and this may be detected by the detection system.

A problem with this method and apparatus relates to the sensitivity to detect rips or tears and the ability to identify the location of such rips or tears.

The invention disclosed herein seeks to overcome one or more of the above identified problems or at least provide a useful alternative.

SUMMARY

In accordance with a first main aspect there is provided, a system for detecting a rip in a conveyor belt carrying a material, the system including: a sensor arrangement configured to provide a light curtain under at least a portion the conveyor belt to detect material passing through the rip thereby detecting the rip.

In an aspect, the portion of the conveyor belt is a loaded portion of the conveyor belt.

In another aspect, the loaded portion of the conveyor belt extends from a chute toward a discharge end of the conveyor belt.

In yet another aspect, an array to light beams therebetween to provide the light curtain.

In yet another aspect, the frequency of the light beams is infrared.

In yet another aspect, the sender and receiver are configured such that the array of light beams is parallel and laterally spaced in a direction width wise of the belt, each of the array of light beams being arranged below the belt and in line with the direction of belt travel.

In yet another aspect, the system includes a computer configured in communication with sensor arrangement such that when a rip is detected an alert state is generated.

In yet another aspect, the system further includes a roller arrangement adapted to apply a transverse load to the converter belt and wherein the sensor arrangement is configured such that the light curtain extends at least partially below the roller arrangement.

In yet another aspect, the system includes further sensors arranged to measure a lateral displacement of an edge of the belt in response to the lateral load thereby providing a further indication of the rip.

In accordance with a second main aspect there is provided, a conveyor arrangement including or associated with a system as defined above and herein.

In accordance with a third main aspect there is provided, a system for detecting a rip in a conveyor belt carrying a material, the system including: a roller arrangement adapted to apply a transverse force to the belt to urge open the rip; a computer, and a sensor arrangement in communication with the computer, wherein the sensor arrangement is adapted to provide a light curtain with a plurality of parallel beams below the belt and in line with the direction of belt travel such that material passing through the rip is able to break one or more of the plurality of parallel beams to provide a signal to the computer indicative of the rip.

In accordance with a fourth main aspect there is provided, a method of detecting a rip in a conveyor belt carrying a material the method including the steps of: arranging a light curtain provided by a sensor arrangement under at least a loaded portion of a conveyor belt so as to detect material passing through the rip thereby detecting the rip.

In an aspect, the method includes providing an alert state if a threshold condition associated with the sensor arrangement is exceeded.

In another aspect, the threshold condition includes at least two light beams of the light curtain being broken.

In yet another aspect, the method includes applying a transverse load to the belt with a roller arrangement to provide the loaded portion.

In yet another aspect, the method includes measuring a lateral displacement of an edge of the belt in response to the transverse load using a further sensor arrangement.

In yet another aspect, the method includes providing a further alert state if the lateral displacement exceeds a further threshold value.

In yet another aspect, the light curtain is formed of a plurality of spaced apart and parallel light beams.

In yet another aspect, the light beams are infra-red.

In yet another aspect, the method includes providing an indication of the lateral position of the rip of the belt.

In yet another aspect, the light curtain is formed of a plurality of spaced apart and parallel light beams, and wherein each of the light beams is associated with a lateral position of the belt, and the method includes providing an indication of the lateral position of the rip of the belt by detecting which of the light beams has been broken.

In yet another aspect, the method includes recording a time period detection of material passing through the belt thereby providing an indication of the length of the rip.

BRIEF DESCRIPTION OF THE FIGURES

The invention is described, by way of non-limiting example only, by reference to the accompanying figures, in which.

DETAILED DESCRIPTION

Referring to FIGS. 1 to 5b, there is shown a conveyor arrangement 5 including a system 10 for detecting or identifying an irregularity such as a rip, tear or other hole in a conveyor belt 12 carrying a material fed from, in this example, a chute 15. The carried material may be a bulk material such as fragmented rock, sand or the like.

Figure 1:
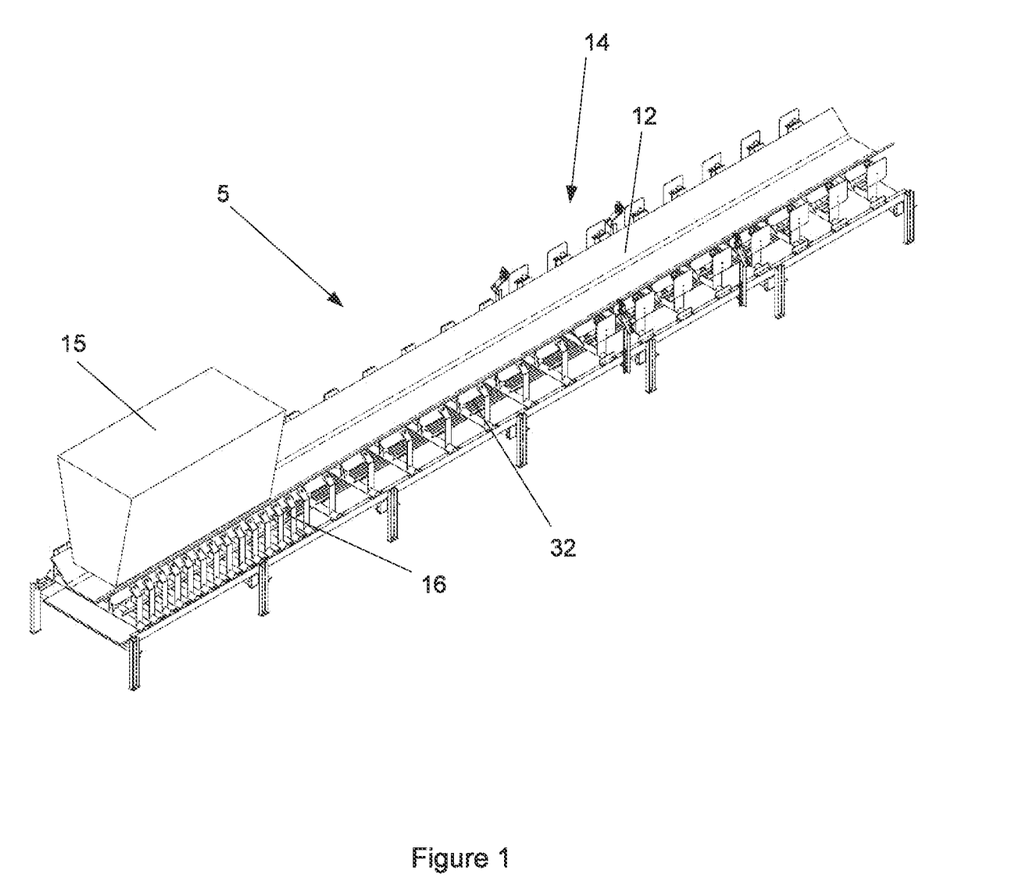
FIG. 1 is a perspective view illustrating a conveyor belt arrangement fitted with a system for detecting a rip in a conveyor belt.
Figure 2A:
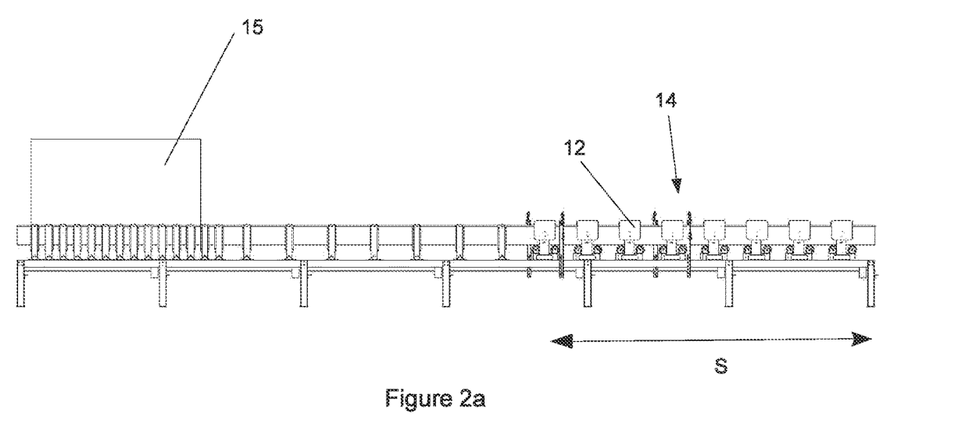
FIG. 2a is a side view illustrating the conveyor belt arrangement.
Figure 2B:
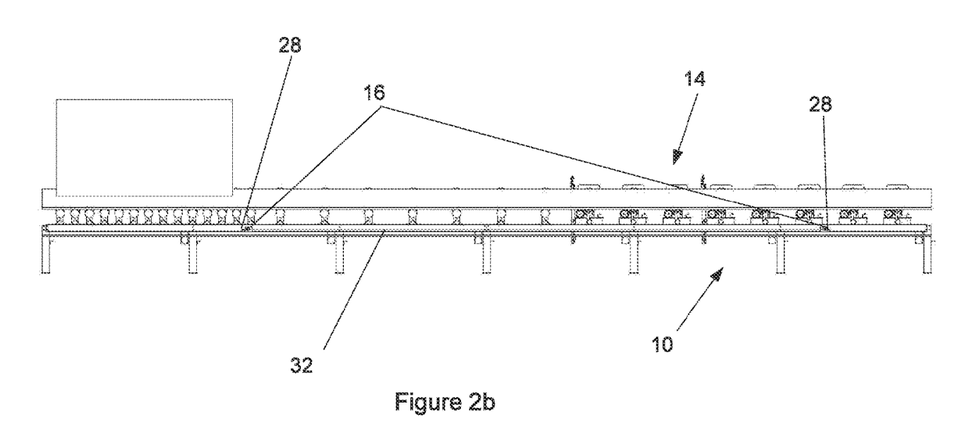
FIG. 2b is a side sectional view along a centre line illustrating the conveyor belt arrangement.
Figure 3:
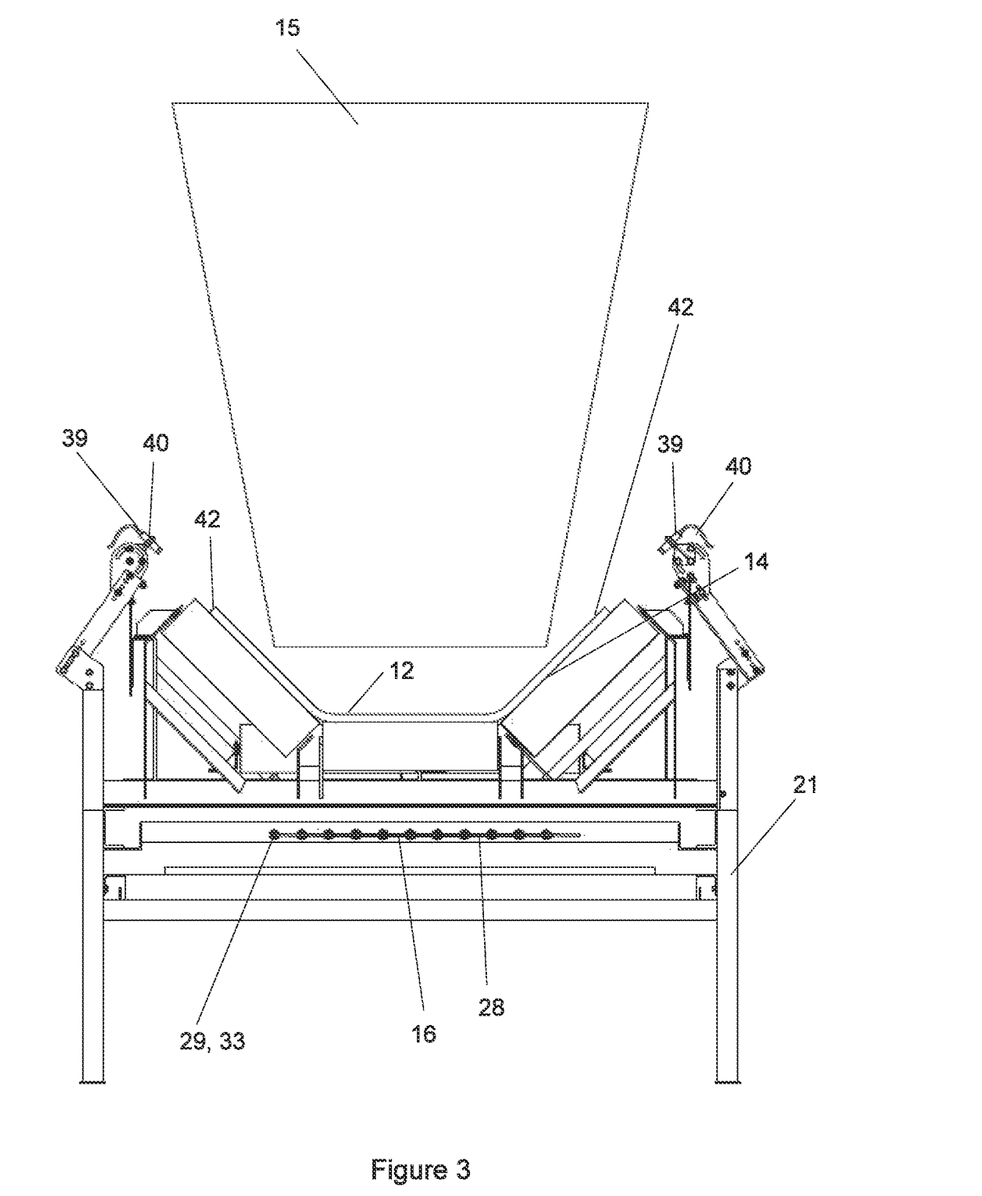
FIG. 3 is an end view illustrating the conveyor belt arrangement and showing the system.
Figure 4:
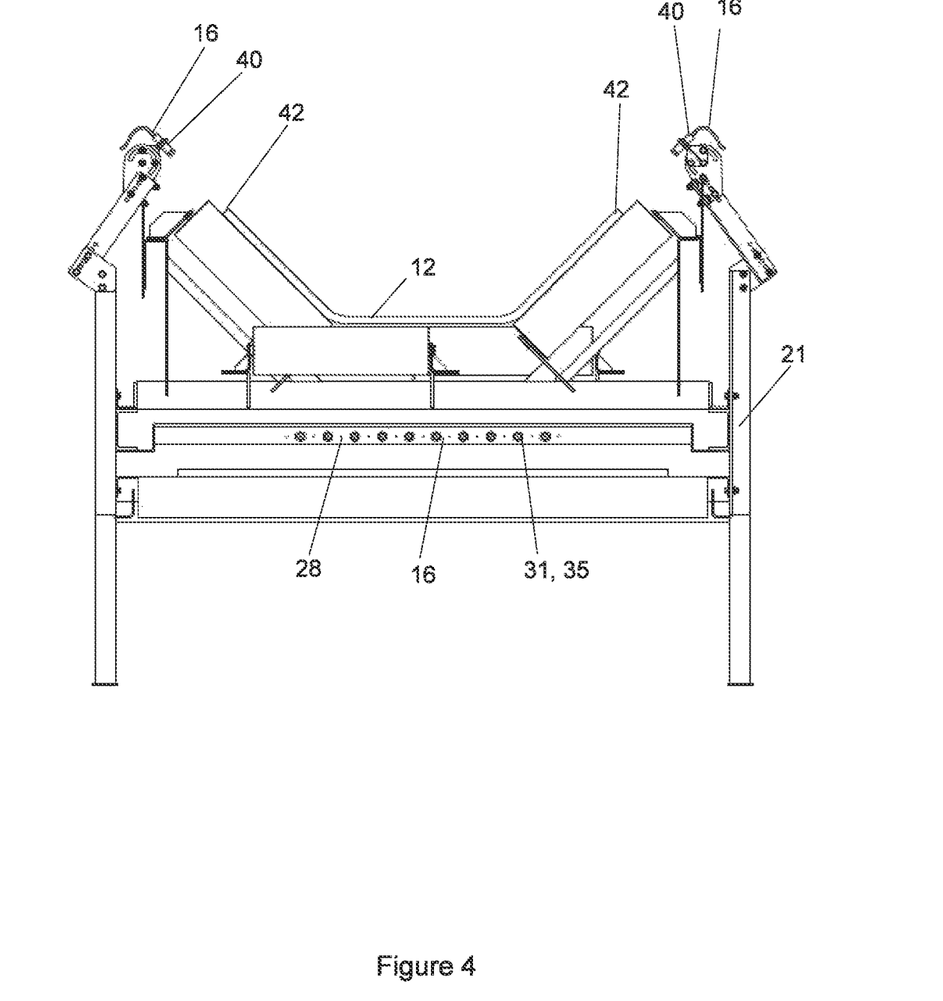
FIG. 4 is another end view illustrating the conveyor belt arrangement and showing the system.

The system 10 includes a roller arrangement 14 that is configured to apply a transverse load to the belt 12 along a section "S", shown in FIG. 2a, which may widen or further open the rip to promote material to fall through the rip. The rip itself is not shown in the drawings. The section "S" may be lengthened or shortened, as required.

The system 10 further includes a sensor arrangement 16 arranged to detect material which has passed or fallen through the rip. Accordingly, the roller arrangement 14 and the sensor arrangement 16 provide a preferable combination to allow the detection of the rip via the material falling through the rip.

However, it is noted that in some examples the roller arrangement 14 may be omitted, especially if the sensor arrangement 16 is arranged beneath section of the belt 12 that may be loaded such as adjacent to or under the chute 15, as the load of material from the chute may serve to stretch the belt 12 and open any rips or tears. As such, the portion or section of belt under the chute 15 may be considered a loaded portion of the belt 12.

The roller arrangement 14 may function in a similar way to that described in AU 2009206205 B2, the contents of which are incorporated by reference, and thus the roller arrangement 14 is not described here in any great detail.

Figure 5A:
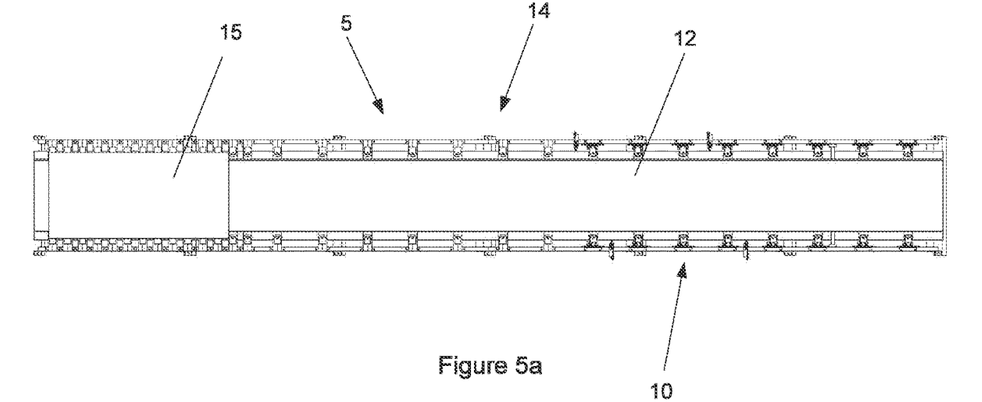
FIG. 5a is a top view illustrating the conveyor belt arrangement and showing the system.
Figure 5B:
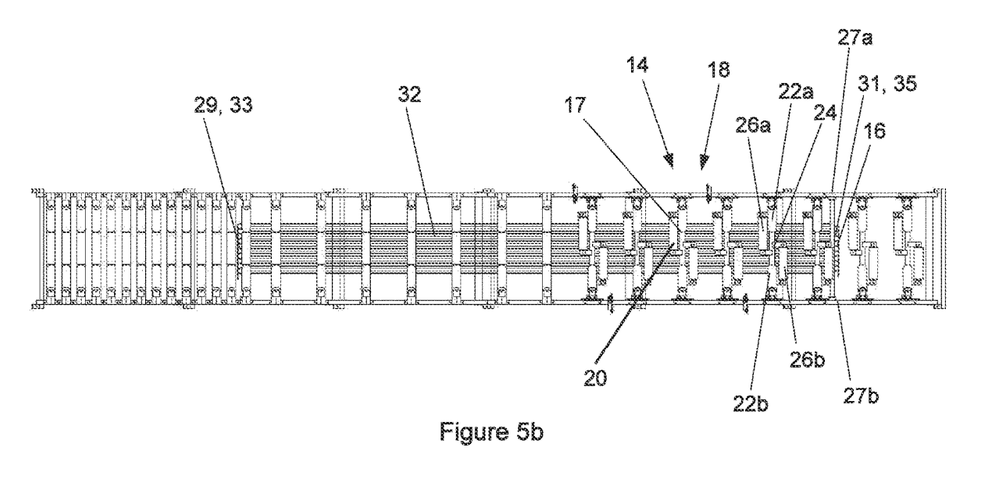
FIG. 5b is a top view illustrating the conveyor belt arrangement with the belt removed, and showing the system.

In this example, the roller arrangement 14 includes offset frames 17 with a plurality of roller sets 18 (best shown in FIG. 5b). Each of the roller sets 18 include four idler rollers 20 coupled to the conveyor frame 21. All of the idler rollers 20 are offset.

The rollers 20 may include two wing rollers 22a, 22b that are coupled to the associated roller cross frame 24, and two inner rollers 26a, 26b that respectively lead and trail the two wing rollers 22a, 22b and are also coupled to the roller cross frame 24. In this example, there are four rollers 20. However, other configurations may have more or less rollers, as required.

Offset roller 26a is adjacent to and in front of wing roller 22a and are each angled similarly outwardly to pull the belt 12 toward one side 27a. The offset roller 26b is adjacent to and behind inline roller 22b, and are also angled similarly outwardly to pull the belt 12 toward the opposing side 27b. Accordingly, as aforesaid, the arrangement is such that a lateral force is applied to the belt to urge any rips open which promotes material to pass through the rip.

In this example, the sensor arrangement 16 includes one or more material sensors 28 that include an array of senders 29 and a corresponding array of receivers 31. The array of senders 29 are configured to emit signals in the form of light beams to provide a light curtain 32 which is received by the corresponding array of receivers 31. The light curtain 32 is generally arranged with its beams parallel the direction of travel of the belt 12, and positioned proximate to but below the belt 12. The light is preferably, but not limited to, infrared light. However, a laser or an array of laser beams could also be used.

The array of senders 29 may be housed on a sender bar or part 33 and the corresponding array of receivers 31 may be housed on a receiving bar or part 35. The sender bar 33 and a corresponding receiver bar 35 may be spaced apart with one of the sender bar 33 and the corresponding receiver bar 35 located beneath the belt 12 proximate the chute and the other of the sender bar 33 and the receiver bar 35 being located proximate the roller arrangement 14 such that the light curtain 32 extends from a location proximate and under a loaded section of the belt 12 under the chute 15 and a second location past and under the roller arrangement 14, which provides a further loaded section via the transverse applied load. This allows rips or tears to be detected early proximate the chute 15 and via the roller arrangement 14 that laterally stretches the belt 12.

It is noted that the sensor arrangement 16 may be arranged so that the light curtain 32 extends between the chute 15 and an end of the roller arrangement 14 as shown in the present example. However, in other examples, the light curtain 32 may extend only under and proximate to the chute 15 such as in an example in which the roller arrangement 14 is omitted, or in other examples the light curtain 32 may generally extend under the roller arrangement 14 only.

The light curtain 32 beneath the belt 12 may detect material falling there through due to a break in one or more of the beams. This allows detection of a rip and also detection of which individual beam has been broken thus indicating where on the belt 12, laterally, the rip or tear may have occurred.

Figure 6:
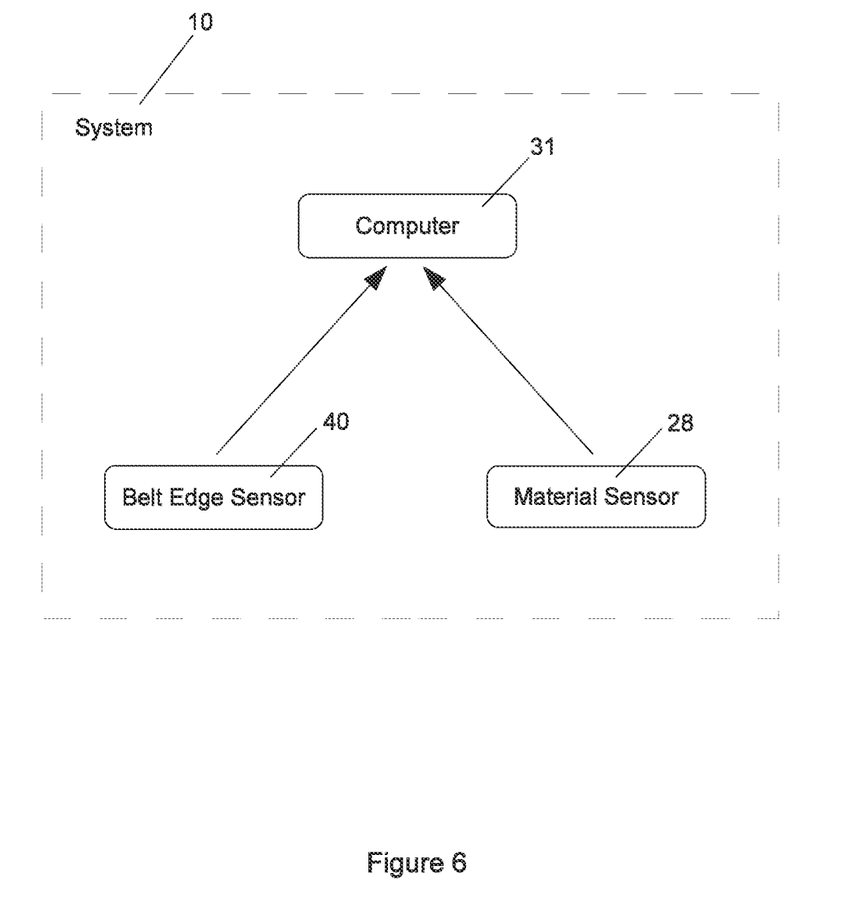
FIG. 6 is a simplified block diagram illustrating the system.

The sensor arrangement 16 may be configured to be in communication either wired or wirelessly, with a computer 31 that may be local or remote. The computer 31 may be one or more computers and form part of or being in communication with the main conveyor control system (not shown).

The computer 31 may be configured by software such that, for example, in the event of the beams being broken an alert event may be triggered that can result in a range of actions such as sending an alert to an operator or an automatic shut down, or "trip event", of the conveyor.

The sensor arrangement 16 may be calibrated or tuned for dust to avoid false triggers and may be set with various thresholds such as, for example, two beams of the light curtain 32 being required to be broken before triggering an alert event, or perhaps a set time the one or more beams need to be broken, such as 3 to 5 seconds, before a triggering an alert event. This may also allow the size of the rip to be inferred, for example, more broken beams indicate a potentially large rip.

The system 10 may also record the time period for which the beams are broken which provides an indication of the length of the rip. For example, the length of the rip may be estimated based on the belt speed, length of the light curtain 32 and time period of which the rip is detected.

An example of a suitable sensor arrangement 16 to provide the light curtain 32 is available from SICK™ and a suitable example model may be the MLG-2 which provides a light curtain, more specifically an infrared light curtain using light emitting diodes and receivers. The wavelength may be 850 nm and the range may be up to about 12 metres. The beam width separation may be in the range of 2.5 mm to 50 mm. However, other suitable sensors may be utilised.

The system 10 may include further a further sensor arrangement 39 including further sensors 40 that are arranged to measure the lateral edge displacement of the belt 12 at side edges 42 thereof. It is noted that the system 10 may include the sensor arrangement 16 to provide the light curtain 32 only, or may include a combination of the sensor arrangement 16 and the further sensor arrangement 39. Both examples are contemplated here.

The further sensors 40 may, for example, be ultrasonic sensors, but other, types of suitable sensors may be used. Such sensors may be configured to measure distance between the sensors 40 and the edges 42 such as by using time of flight.

Accordingly, if there is a rip or tear present, then one or more of the edges 42 of the belt may move beyond a threshold amount and thus trigger an alert event or trip event indicating an irregularity such as a rip or tear in the belt 12. The system 10, namely the computer 31, may be configured to receive a signal from the sensor arrangement 16 and the further sensor arrangement 39, and may be, for example, to compare if a trigger or trip event has occurred at via both sets of sensors arrangements 16, 39 thereby providing the system 10 with the ability to cross check trigger conditions and/or have redundancy should one of the detection methods not function as expected.

Advantageously, there has been described a method and system for the detection of an irregularity in a belt such as a rip or tear. The method and system include using a sensor arrangement under the belt to provide a light or sensing curtain to detect material passing or falling through the belt to therefore indicate a rip or tear in the belt. Examples of the method and system may additionally include the use of a roller arrangement configured to urge the belt laterally apart to open the rip or tear to promote material to pass through the rip or tear and thus past the light curtain, to thereby allow detection of the rip or tear. The method and system may include the use of further sensors to detect the edge movement of the belt thus having two means by which the rip or tear may be detected which allows for cross checking and robustness.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

What is claimed is:

1. A system for detecting a rip in a conveyor belt carrying a material, the system including: a sensor arrangement configured to provide a light curtain under at least a portion the conveyor belt to detect material passing through the rip thereby detecting the rip, wherein the sensor arrangement includes a sender and a receiver adapted to communicate an array of light beams therebetween to provide the light curtain, and wherein the sender and receiver are configured such that each of the array of light beams are parallel, laterally spaced in a direction width wise of the conveyor belt, and arranged below the conveyor belt in line with a direction of belt travel.

2. The system according to claim 1, wherein the portion of the conveyor belt is a loaded portion of the conveyor belt.

3. The system according to claim 2, wherein the loaded portion of the conveyor belt extends from a chute toward a discharge end of the conveyor belt.

4. The system according to claim 1, wherein a frequency of the light beams is infrared.

5. The system according to claim 1, wherein the system includes a computer configured in communication with the sensor arrangement such that when a rip is detected an alert state is generated.

6. The system according to claim 1, wherein the system further includes a roller arrangement adapted to apply a transverse load to the conveyor belt and wherein the sensor arrangement is configured such that the light curtain extends at least partially below the roller arrangement.

7. The system according to claim 6, wherein the system includes further sensors arranged to measure a lateral displacement of an edge of the conveyor belt in response to a lateral load thereby providing a further indication of the rip.

8. The system according to claim 1, wherein the array of light beams are laser beams.

9. The system according to claim 1, wherein the sender includes an array of senders and the receiver include a corresponding array of receivers.

10. The system according to claim 9, wherein the array of senders are housed in a sender bar, and the array of receivers are housing in a corresponding receiver bar.

11. A system for detecting a rip in a conveyor belt carrying a material, the system including: a roller arrangement adapted to apply a transverse force to the conveyor belt to urge open the rip; a computer; and a sensor arrangement in communication with the computer, wherein the sensor arrangement is adapted to provide a light curtain with a plurality of parallel beams below the conveyor belt and in line with a direction of belt travel such that material passing through the rip is able to break one or more of the plurality of parallel beams to provide a signal to the computer indicative of the rip.

12. A method of detecting a rip in a conveyor belt carrying a material the method including the steps of: arranging a light curtain provided by a sensor arrangement with a plurality of spaced apart and parallel light beams of the light curtain in line with a direction of belt travel under at least a loaded portion of the conveyor belt such that each of the parallel light beams is associated with a lateral position of the conveyor belt, and providing an indication of a lateral position of the rip of the conveyor belt by detecting which of the parallel light beams has been broken because of the material passing through the rip.

13. The method according to claim 12, wherein the method includes providing an alert state if a threshold condition associated with the sensor arrangement is exceeded.

14. The method according to claim 13, wherein the threshold condition includes at least two light beams of the light curtain being broken.

15. The method according to claim 13, wherein the method includes applying a transverse load to the conveyor belt with a roller arrangement to provide the loaded portion.

16. The method according to claim 15, wherein the method includes measuring a lateral displacement of an edge of the conveyor belt in response to the transverse load using a further sensor arrangement.

17. The method according to claim 16, wherein method includes providing a further alert state if the lateral displacement exceeds a further threshold value.

18. The method according to claim 12, wherein the parallel light beams are infrared.

19. The method according to claim 12, wherein the method includes recording a time period of detection of the material passing through the conveyor belt thereby providing an indication of a length of the rip.

* * * * *